N. Gear,
Cutting Irregular Forms,
Nº 10,204. Patented Nov. 8, 1853.
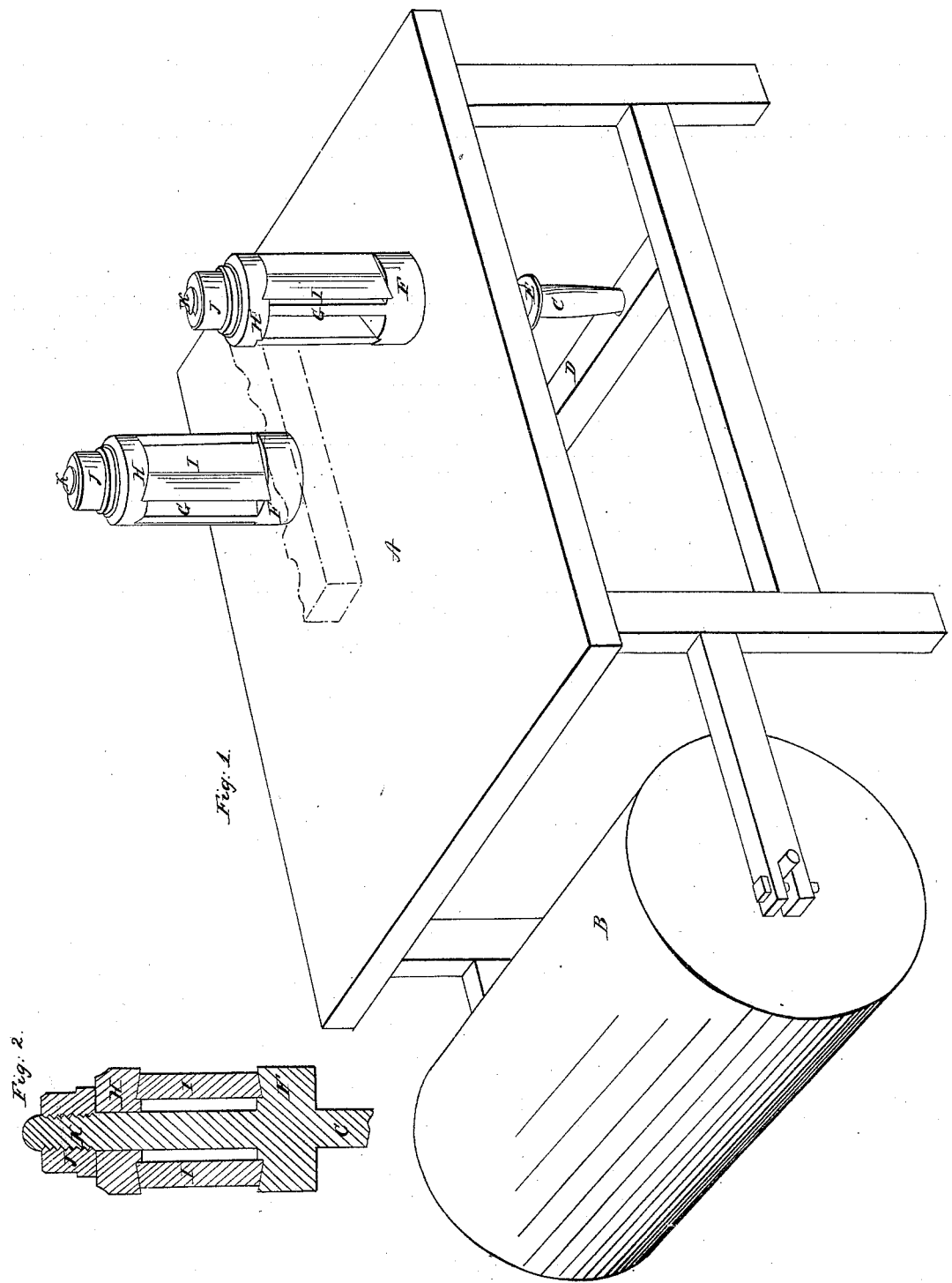

UNITED STATES PATENT OFFICE.

NATHANIEL GEAR, OF ZANESVILLE, OHIO.

MACHINE FOR TURNING OR CUTTING IRREGULAR FORMS.

Specification of Letters Patent No. 10,204, dated November 8, 1853.

*To all whom it may concern:*

Be it known that I, NATHANIEL GEAR, of Zanesville, in the county of Muskingum and State of Ohio, have invented certain new and useful Improvements in Machines for Cutting Irregular Forms; and I do hereby declare the following to be a full, clear, and exact description of the same, reference being had to the accompanying drawings, making a part thereof, in which—

Figure 1 represents a perspective view of the machine complete, and Fig. 2, a vertical section through one of the cutters.

Similar letters in both the figures denote the same parts.

The nature of my invention consists in making the cutter heads, one or both, guides or gages for the setting of the cutting edges of the knives therein, and also guides or gages to the pattern of the thing to be cut; also, in the peculiar manner of securing the cutters into the cutter heads by dovetails, thus avoiding the use of keys, wedges, screws, or any other device than the shape of the ends of the knives and grooves into which they fit.

To enable others skilled in the art to make and use my invention, I will proceed to describe the same with reference to the drawings.

The table A may be built in any substantial manner and of suitable size for the material to be cut thereon. A pulley or drum B, is connected therewith, which receives its motion from any first mover and by means of belts passing around it and the vertical shafts C, of the cutters communicate motion to said shafts and the cutter heads and cutters thereon. The shaft C rest and rotate in steps in the cross beam D, and should have upon them a collar E , to hold up the belt, and also another collar immediately underneath the table to keep them from rising out of their steps. Any other device however may be used for this purpose. The shafts C, rise up through the table or bed A, and near the surface of the table, on top thereof, on said shaft, is permanently fixed the lower cutter head F, from which projects still farther upward a brace or center piece G, for furnishing support to the upper cutter head H, which is removable and also for forming a throat to the cutters. The shaft, its collars, the lower cutter head, and brace or center piece may all be cast or wrought in one piece. The upper cutter head is removable, for the purpose of removing and replacing the knives therein, and the lower cutter head or either of them may work in loose collars, so that the collars shall be the guides and remain stationary. Inclined grooves, recesses, or dove tails are cut in the lower and upper cutter heads, as seen in the drawings (more particularly shown in Fig. 2) into which are slipped or set the cutters I, and when properly adjusted to the peripheries of the cutter heads the nut J, is run down upon the screw cut upon the shank K which is a mere elongation of the shaft C, and the whole is firmly and securely held together.

The red lines Fig. 1, represent a pattern having one irregular edge. To cut a duplicate of this pattern, a suitable piece of material is placed on top of it, and held there by a few sharp metallic points in the upper side of the pattern. The two pieces are fed along by hand in the direction of the running of the cutters, which draws the pattern or both tight up against the lower cutter head. The cutters work upon the edge of the piece to be cut, while the cutter head receives the pattern and prevents it and the piece upon it from coming any closer to the cutters than a fixed distance. As the knives are gaged by the cutter head and the pattern is also guided by the cutter head. which serves as a gage to the pattern, it is evident that the piece will be cut precisely to the pattern, that is within the limit of the operation of the machine, said limit being to the periphery of the cutter head.

I have shown two sets of cutters on the same table. Both are not absolutely necessary. One is sufficient for almost every purpose, but it may be found advantageous to run one cutter in one direction, the other in an opposite one, so that instead of turning the pattern and piece end for end, after it has passed one cutter, it may be moved against the opposite cutter and have its opposite side dressed while returning to that end of the table from whence it first started. The pattern and piece, instead of being fed by hand past the cutters, may be carried by machinery if found essential, but by moving the wood or other material with the cutters no other power than the drawing up of the piece by the action of the cutters upon it will be found necessary, although mechanical means may be used if preferred. Instead, also of using the lower cutter head for the gage or guide the cutters may be let down, or the table or bed raised up, so that the pattern may be on the top of the piece to be cut and be gaged or guided by the upper cutter head. The edges of the knives also instead of being straight may be curved, indented, convex or concave, or inclined for the purpose of cutting a corresponding surface on the material operated upon. The shafts of the cutters or the bed may be inclined for some work.

The machine is peculiarly adapted to the cutting of the arms, backs, legs and frames of chairs, boot trees, the curved or irregular work of carriages or cars, and from its extreme simplicity and cheapness, is within the reach of any mechanic.

Having thus fully described the nature of my invention, what I claim therein as new and desire to secure by Letters Patent is,

The combination of knives in the manner described with a rotary cutter head, so that said head shall serve as a guide or directrix to the form or pattern carrying the material to be dressed.

NATHANIEL GEAR.

Witnesses:
F. A. SEBORN,
FRED D. STURGES.